United States Patent
Rodrigues et al.

[11] Patent Number: 5,954,778
[45] Date of Patent: *Sep. 21, 1999

[54] FOUR-WHEEL DRIVE TRANSFER CASE CONTROLLER WITH TORQUE DECREMENT STRATEGY

[75] Inventors: Ashok Rodrigues, Canton; John Glab, Riverview, both of Mich.

[73] Assignee: Ford Global Technologies, Inc., Dearborn, Mich.

[*] Notice: This patent is subject to a terminal disclaimer.

[21] Appl. No.: 08/756,359

[22] Filed: Nov. 26, 1996

[51] Int. Cl.$^6$ ................................................ G06F 7/70
[52] U.S. Cl. ................................ 701/69; 701/70; 701/74; 701/89; 180/197; 180/233; 180/248
[58] Field of Search ................................ 701/69, 70, 74, 701/89; 180/197, 233, 248

[56] References Cited

U.S. PATENT DOCUMENTS

| | | | |
|---|---|---|---|
| 3,656,573 | 4/1972 | Halberg | 180/44 R |
| 4,467,886 | 8/1984 | DeClaire et al. | 180/197 |
| 4,718,303 | 1/1988 | Fogelberg | 74/710.5 |
| 4,773,517 | 9/1988 | Watanabe | 192/0.032 |
| 4,884,653 | 12/1989 | Kouno | 180/233 |
| 4,961,476 | 10/1990 | Witte et al. | 180/192 |
| 4,986,388 | 1/1991 | Matsuda | 180/248 |
| 4,989,686 | 2/1991 | Miller et al. | 180/197 |
| 4,991,678 | 2/1991 | Furuya et al. | 180/197 |
| 5,032,995 | 7/1991 | Matsuda et al. | |
| 5,060,747 | 10/1991 | Eto | 180/197 |
| 5,197,566 | 3/1993 | Watanabe et al. | 180/249 |
| 5,215,160 | 6/1993 | Williams et al. | 180/197 |
| 5,219,038 | 6/1993 | Hamada et al. | 180/248 |
| 5,407,024 | 4/1995 | Watson et al. | 180/248 |
| 5,461,568 | 10/1995 | Morita | |
| 5,479,348 | 12/1995 | Sasaki | |
| 5,752,211 | 5/1998 | Takasaki et al. | 701/69 |
| 5,809,443 | 9/1998 | Perttunen et al. | 701/69 |

FOREIGN PATENT DOCUMENTS

| | | |
|---|---|---|
| 0298397 A2 | 1/1989 | European Pat. Off. |
| 0393596 A2 | 10/1990 | European Pat. Off. |

*Primary Examiner*—William A. Cuchlinski, Jr.
*Assistant Examiner*—Yonel Beaulieu
*Attorney, Agent, or Firm*—James J. Dottavio

[57] ABSTRACT

A method of controlling the amount of power delivered to the front driveshaft and to the rear driveshaft of a motor vehicle including the steps of generating a front driveshaft value indicative of the rotational speed of said front driveshaft and generating a rear driveshaft value indicative of the rotational speed of said rear driveshaft. A vehicle speed is generated based on the lower of said front driveshaft value and said rear driveshaft value. The amount of power delivered to said front driveshaft and to said rear driveshaft is controlled as a function of said vehicle speed.

14 Claims, 2 Drawing Sheets

3,954,778

FOUR-WHEEL DRIVE TRANSFER CASE CONTROLLER WITH TORQUE DECREMENT STRATEGY

BACKGROUND OF THE INVENTION

1. Field of the Invention

This invention relates to the field of electronic powertrain controllers, and more particularly to the field of four-wheel drive vehicles which utilize an electronic powertrain controller.

2. Discussion of the Prior Art

Four-wheel drive vehicles provide traction often unattainable in two-wheel drive vehicles by delivering power to each of the vehicle's four wheels. Attendant with the added traction provided by four wheel drive is the added complexity of the drive train required to control and deliver power to all four wheels as opposed to only two wheels. For instance, it is desirable to alter the delivery of power to the front wheels and the rear wheels depending upon whether the vehicle is turning, or is being driven on low traction surfaces such as rain or ice covered surfaces to eliminate relative slip between the front and rear tires. Strategies designed to compensate for this slip must try to satisfy conflicting vehicle requirements, namely, the need to provide torque to a wheel pair and the need to release the limited slip device to prevent bindup. Rapid release of the limited slip device to prevent bindup may lead to an extended cycling condition, which in turn may produce NVH problems and durability concerns in the limited slip device.

The delivery of power between the front wheels and the rear wheels of the vehicle is typically handled by a transfer case mechanism, which includes either a mechanically or electronically controlled clutch. The inventors herein have recognized that known transfer case control systems experience problems particularly when turning on dry pavement where bindup is frequently experienced.

Accordingly, there is a need for a control mechanism for a transfer case in a four-wheel drive vehicle which balances the parameters of torque transfer between the front and rear wheels and release of the limited slip device, thereby preventing wheel bindup particularly during cornering on dry pavement.

SUMMARY OF THE INVENTION

It is an object of the present invention to control a four-wheel drive mechanism in a vehicle in a manner which balances the parameters of torque transfer between the front and rear wheels and the release of the limited slip device, thereby preventing wheel bindup, particularly during cornering on dry pavement.

In accordance with the objects of the invention, in a preferred embodiment, in a vehicle which includes a front driveshaft for transferring motive power to a front set of wheels and a rear driveshaft for transferring motive power to a rear set of wheels, the amount of power delivered to the front driveshaft and to the rear driveshaft is determined in part by generating a front driveshaft value indicative of the rotational speed of the front driveshaft and generating a rear driveshaft value indicative of the rotational speed of the rear driveshaft. A vehicle speed is generated based on the lower of said front driveshaft value and said rear driveshaft value. The amount of power delivered to said front driveshaft and to said rear driveshaft is controlled as a function of said vehicle speed.

An advantage of certain preferred embodiments is that the amount of power transmitted to the wheels at low speeds is decremented quickly, thereby reducing bindup, particularly on dry pavement.

These and other features and advantages of the present invention may be better understood by considering the following detailed description of a preferred embodiment of the invention. In the course of this description, reference will frequently be made to the attached drawings.

DETAILED DESCRIPTION OF A PREFERRED EMBODIMENT

Figure 1:
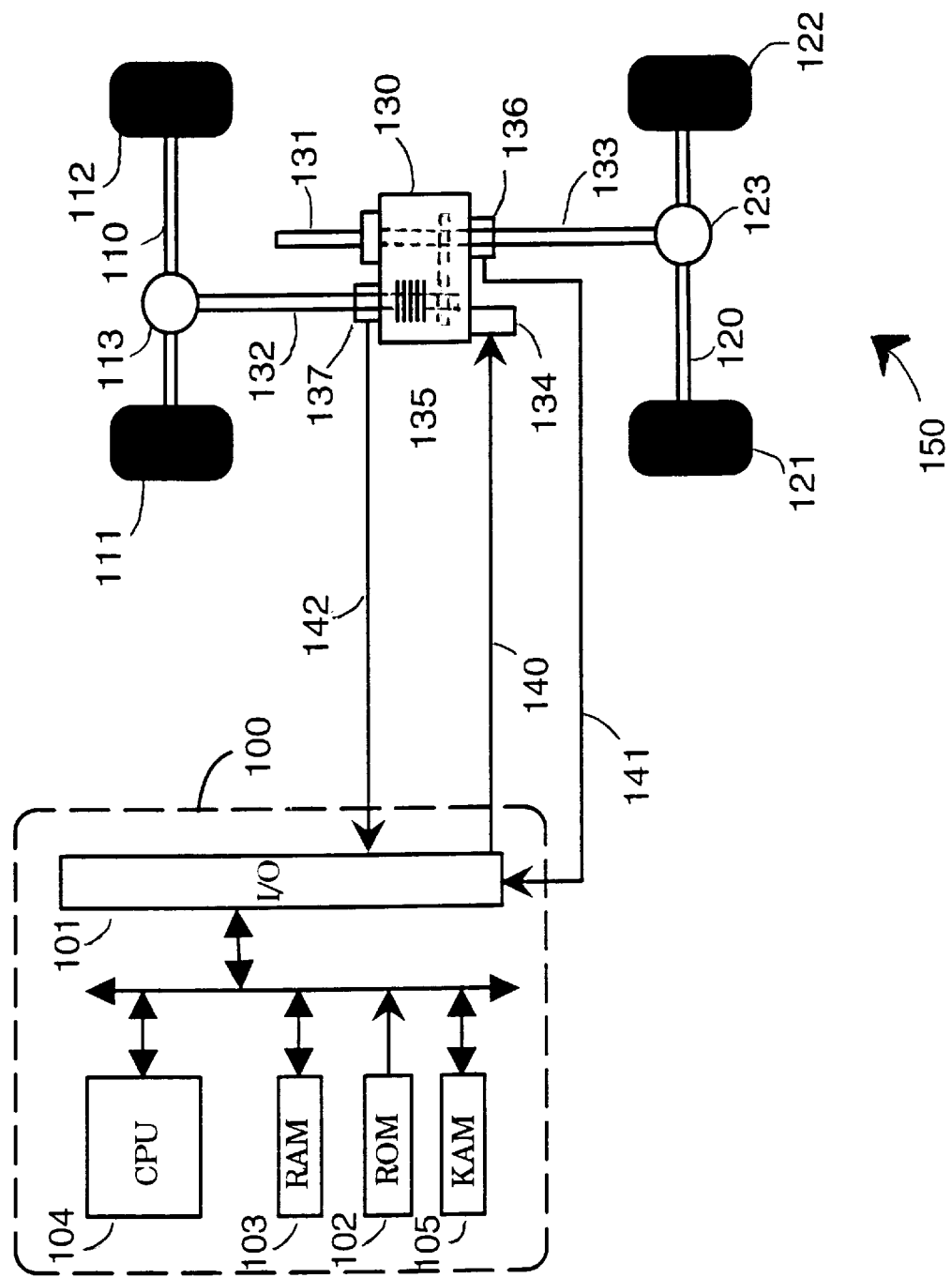
FIG. 1 of the drawings shows a block diagram of a powertrain controller and a four-wheel drive powertrain which embody the principles of the invention.

In FIG. 1 of the drawings, a powertrain controller 100 controls the operation of a transfer case 130 of a four-wheel drive vehicle 150. Powertrain controller 100 preferably includes a central processing unit 104, a read-only memory (ROM) 102 for storing control programs, a random-access memory (RAM) 103 for temporary data storage, a keep-alive-memory (KAM) 105 for storing learned values, a conventional data bus and I/O ports 101 for transmitting and receiving signals to and from the transfer case 130.

Transfer case 130 includes an electronically controlled clutch 135 for transferring motive power from an input shaft 131, which transmits power from an engine transmission, to front driveshaft 132 and rear driveshaft 133, in response to a clutch Pulse Width Modulated (PWM) signal 140 generated by powertrain controller 100. Transfer case 130 preferably takes a form as described in U.S. Pat. No. 4,718,303, to Mark J. Fogelberg, entitled "Four Wheel Drive Transfer Case With Clutch Mechanism", which is incorporated herein by reference in its entirety. Clutch 135 preferably takes a form as described in U.S. Pat. No. 4,989,686, to Miller et al, entitled "System For Controlling Torque Transmission In A Four Wheel Drive Vehicle" ('686 Patent), or U.S. Pat. No. 5,407,024 to Watson, et al, entitled "On Demand Vehicle Drive System", which are hereby incorporated by reference in their entirety. As described in the '686 Patent, clutch 135 takes the form of an electromagnetic clutch which operates in accordance with a clutch PWM signal, which controls the amount of slippage between friction plates of the clutch by altering a magnetic field causing movement of an apply plate which engages the friction plates, thereby controlling the amount of power delivered from the input shaft 131 to the front and rear driveshafts. As described by Miller et al, the clutch, when engaged, either fully or partially, preferably operates to add torque to the slower turning of the two driveshafts (front or rear) and to subtract torque from the faster turning driveshaft.

Front driveshaft 132 provides motive power to a front differential 113, which controls the amount of motive power delivered over a pair of front wheel shafts to a left front wheel 111 and a right front wheel 112. Rear driveshaft 133 provides motive power to a rear differential 123, which controls the amount of motive power delivered over a pair of wheel shafts to a left rear wheel 121 and a right rear wheel 122. A front driveshaft speed sensor 137 detects the rotational speed of the front driveshaft 132 and transmits a front driveshaft speed signal 142 to powertrain controller 100. A rear driveshaft speed sensor 136 detects the rotational speed of the rear driveshaft 133 and transmits a rear driveshaft speed signal 141 to powertrain controller 100. Sensors 137 and 136 are preferably conventional magnetic type sensors, which transmit a pulse in response to rotation of each tooth on a gear or rotor secured to turn with the driveshaft, past the sensor. Thus, the frequency of signals 141 and 142 are proportional to the rotational speed of the respective driveshaft.

A preferred embodiment of the present invention advantageously generates clutch PWM signal 140 in a manner which adjusts the amount of power delivered by front driveshaft 132 and rear driveshaft 133 to compensate for differing effective diameters of wheels 111, 112, 121 or 122. As will be appreciated by those skilled in the art in view of the present disclosure, the wheels of a vehicle may have differing effective diameters, as described in copending U.S. patent application Ser. No. 08/352,668, filed Dec. 9, 1994, which is assigned to the assignee of the present application and which is hereby incorporated by reference ('668 application).

Figure 2:
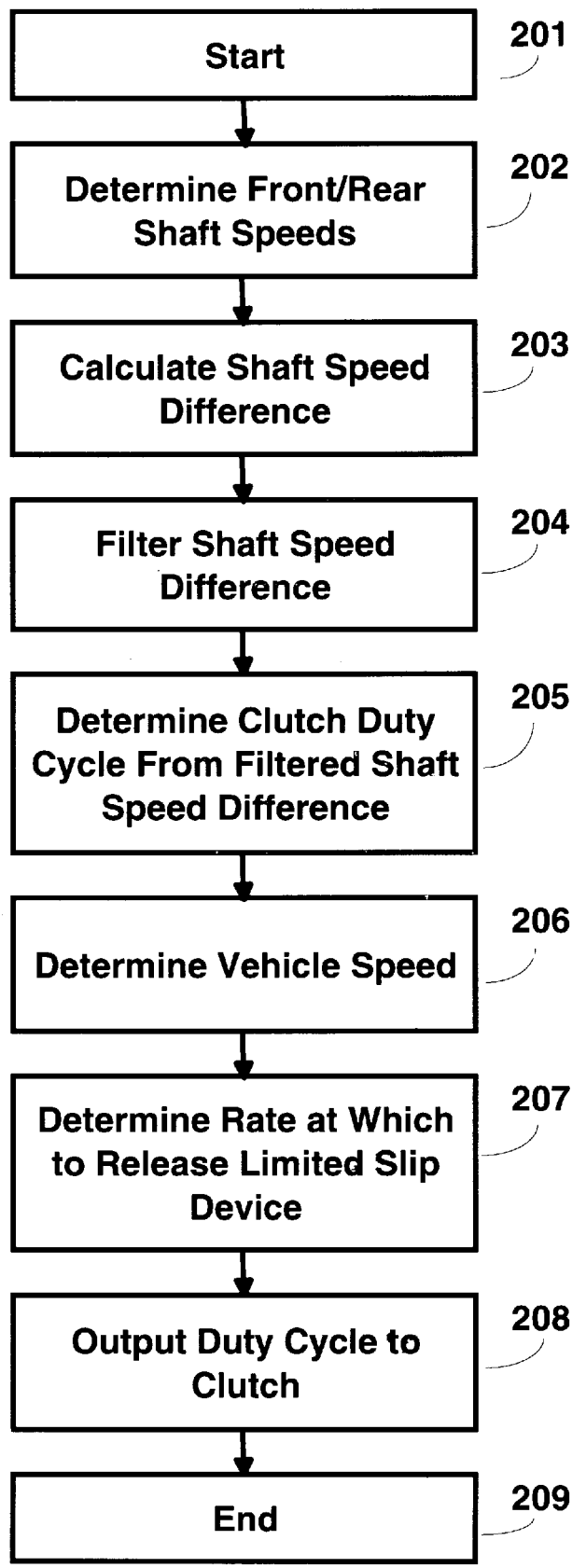
FIG. 2 is a flowchart of the steps executed in a preferred embodiment.

FIG. 2 of the drawings shows the steps of a clutch routine which is executed by powertrain controller 100 as a portion of a stored program to adjust the release rate of the limited slip device, including clutch 135, based on vehicle speed. The clutch routine is initiated at 201. At 202, a front driveshaft value, which is indicative of the rotational speed of the front driveshaft is generated as a function of information contained on front driveshaft speed signal 142. Also, at step 202, a rear driveshaft value, which is indicative of the rotational speed of the rear driveshaft, is generated as a function of information contained on rear driveshaft speed signal 142. At step 203, a difference value, which is indicative of a difference between the front driveshaft value and the rear driveshaft value, is generated. At step 204, the difference value is filtered to remove low frequency components.

As will be appreciated by those skilled in the art in view of the present disclosure, removal of low frequency components from the difference value results in a value which is indicative of high frequency differences between the rotational speed of the front driveshaft and the rotational speed of the rear driveshaft. Thus, for a vehicle which has one wheel with a smaller effective wheel diameter than the others and is traveling in a straight line at a steady speed, the difference value may indicate a difference in the rotational speeds of the front and rear driveshaft. However, the difference value will be comprised only of low frequency components and the filtered difference value generated at step 204 will indicate that no change in the rotational speeds of the front driveshaft and the rear driveshaft is required. However, when transient conditions, such as vehicle turning and low traction surfaces, cause rapid changes in the rotational speeds of the front and rear driveshafts, the filtered difference value will reflect the high frequency differences in the rotational speeds of the front and rear driveshafts. Filtering of the difference value is advantageously performed by a first order high pass filter which has a transfer function Y(s) in the S-domain, and transformed into the digital time domain as described in the '668 application and shown below. Alternatively, the signal may be filtered digitally, as suggested in the '686 Patent, thereby removing the low frequency component.

$$Y(s)=s/(s+a)$$

Transforming the above S-domain equation into the digital time domain yields the following relationship:

$$y(k)=U(k)-(1-\beta)*U(k)+\beta* y(k-1)$$

where, u(k) corresponds to the difference value;

y(k) corresponds to the filtered value;

$\beta=e^{-a*T}$ $a=2\pi*fc$;

fc=corner frequency of the filter; and

T=an amount of time elapsed between execution of the wheel diameter compensation routine and a subsequent execution of the routine.

In a preferred embodiment, T has a value of approximately twenty milliseconds, fc has a value of one hertz, and β has a value of 0.88.

At 205, clutch PWM signal 140 is generated as a function of the filtered value as described below. Clutch PWM signal 140 is a fixed frequency signal with a duty cycle which is altered to have a minimal duty cycle when the filtered difference in rotational speeds between the front and rear driveshafts is below a calibratible slip allowance. Such a calibratible allowance is described in the '024 patent in columns 19–20 with reference to Table II. When the filtered value indicates a difference in rotational speed between the front and rear driveshafts exceeding a calibratible slip allowance, the duty cycle of clutch PWM signal 140 increases at a fixed interval to a maximum duty cycle, or until the filtered value indicates no high frequency differences between the rotational speeds of the front and rear driveshafts. Clutch PWM signal 140 preferably takes the form of a series of pulses, which has a fixed frequency, and a duty cycle, which varies to control the amount of slippage in clutch 135.

As described in the '024 patent at columns 21–22, the PWM signal 140 to the clutch 135 is incremented and decremented in a predetermined number of steps. In the preferred embodiment as described below, the PWM signal is decremented in 2% intervals at vehicle speeds above 16 kph and 10% intervals at vehicle speeds at 16 kph or below. The range of the PWM signal 140 includes a calibratible minimum and maximum value, such as the 88% and 8% PWM values described in the '024 patent.

At 206, the filtered rotational speed of the front and rear shafts are compared to determine the lower rotational speed of the two shafts, indicating which pair of wheels is not slipping. The vehicle speed is preferably calculated using the lower filtered shaft speed. The vehicle speed is calculated based on the lower filtered driveshaft speed, tire/wheel size and axle ratio. Once the vehicle speed is determined, the rate at which to release the limited slip device is calculated, so the device is released more quickly at lower vehicle speeds so the torque transfer does not create bindup or NVH problems, for example, when turning on dry pavement.

In a preferred embodiment, the clutch release rate is calculated as follows:

If vehicle speed>Decr_Step_Thresh_KPH, then

Decrement rate=Decr_Step_Above_Thresh_KPH,

Else Decrement rate=Decr_Clutch_DC where Decr_Step_Thresh_KPH is the threshold speed above which a first decrement rate is used, and below which a second decrement rate is used to release the clutch 135. Decr_Step_Above_Thresh_KPH is a calibratible constant which establishes the first decrement rate. Decr_Clutch_DC is a calibratible constant which establishes the second decrement rate.

In a preferred embodiment the calibrated values for the above parameters are as follows:

Decr_Step_Thresh_KPH=16 KPH,
Decr_Step_Above_Thresh_KPH=2%, and
Decr_Clutch_DC=10%

One skilled in the art recognizes the above values may be calibrated based on vehicle parameters and the operational characteristics desired. Furthermore, the above values may be used to increase the rate at which the limited slip device is applied.

In an alternative embodiment, similar logic is applied to determine the apply rate of the limited slip device. In this embodiment, above 16 KPH the increment rate is 10%, while below 16 KPH the increment rate is 2%. Thus, as the vehicle is turning on dry pavement and slippage occurs, the torque transfer is not incremented at such a rate that bindup occurs. However, at higher speeds the limited slip device is applied more rapidly.

In a further alternative embodiment, when a large differential in the rotational speed of the front and rear driveshafts exists at lower speeds (e.g. <16 KPH), the lower decrement rate is used, because slippage is likely to be present and bindup is less likely. However, as the rotational speeds are more closely matched, the higher decrement rate is used. In one embodiment, a 25% differential in shaft speeds (Shaft_Diff_Spd) is used to determine when the larger decrement rate is to be used at lower speeds as described above.

It is to be understood that the specific mechanisms and techniques which have been described are merely illustrative of one application of the principles of the invention. Numerous modifications may be made to the methods and apparatus described without departing from the true spirit and scope of the invention.

We claim:

1. In a vehicle which includes a front driveshaft for transferring motive power to a front set of wheels and a rear driveshaft for transferring motive power to a rear set of wheels, a method of controlling the amount of power delivered to said front driveshaft and to said rear driveshaft, comprising the steps of:

generating a front driveshaft value indicative of the rotational speed of said front driveshaft;

generating a rear driveshaft value indicative of the rotational speed of said rear driveshaft;

generating a vehicle speed based on the lower of said front driveshaft value and said rear driveshaft value; and controlling the amount of power delivered to said front driveshaft and to said rear driveshaft as a function of said vehicle speed.

2. The method as set forth in claim 1, wherein the vehicle includes an electronically controlled clutch which controls the amount of power delivered to said front driveshaft and to said rear driveshaft in accordance with a pulse width modulated signal which controls the amount of power transferred from a transmission to said front driveshaft via said clutch.

3. The method as set forth in claim 2, further comprising the steps of:

generating a difference value indicative of a difference between said front driveshaft value and said rear driveshaft value;

generating a filtered difference value by filtering said difference value to remove low frequency components of said difference value; and controlling the amount of power delivered to said front driveshaft and to said rear driveshaft as a function of said filtered difference value.

4. The method as set forth in claim 3, wherein the clutch is released at a first decrement rate if the vehicle speed is above a calibratible speed level and the clutch is released at a second decrement rate if the vehicle speed is not above the calibratible speed level.

5. The method as set forth in claim 4, wherein the calibratible speed level is approximately 16 KPH, the first decrement rate is approximately 2%, and the second decrement rate is approximately 10%.

6. The method as set forth in claim 5, further comprising the steps of:

comparing the front driveshaft value to the rear driveshaft value to determine if wheel slippage is occurring; and if wheel slippage is not occurring, then decrement clutch.

7. The method as set forth in claim 6, wherein slippage is occurring where the difference in driveshaft values is greater then a calibratible limit.

8. The method as set forth in claim 7, wherein the clutch is applied at a first increment rate if the vehicle speed is above a calibratible speed level and the clutch is applied at a second increment rate if the vehicle speed is not above the calibratible speed level.

9. The method as set forth in claim 8, wherein the calibratible speed level is approximately 16 KPH, the first increment rate is approximately 10%, and the second increment rate is approximately 2%.

10. A vehicle powertrain controller for controlling delivery of power to four wheels of a vehicle carried by front and rear driveshafts, comprising:

means for generating a front driveshaft value indicative of the rotational speed of said front driveshaft;

means for generating a rear driveshaft value indicative of the rotational speed of said rear driveshaft;

means for generating a vehicle speed based on the lower of said front driveshaft value and said rear driveshaft value; and means for controlling the amount of power delivered to said front driveshaft and to said rear driveshaft as a function of said vehicle speed.

11. The controller as set forth in claim 10, wherein the vehicle includes an electronic controlled clutch which controls the amount of power delivered to said front driveshaft and to said rear driveshaft in accordance with a pulse width modulated signal which controls the amount of power transferred from a transmission to said front driveshaft via said clutch.

12. The controller as set forth in claim 11, further comprising the steps of:

means for generating a difference value indicative of a difference between said front driveshaft value and said rear driveshaft value;

means for generating a filtered difference value by filtering said difference value to remove low frequency components of said difference value; and means for controlling the amount of power delivered to said front driveshaft and to said rear driveshaft as a function of said filtered difference value.

13. The method as set forth in claim 12, wherein the clutch is released at a first decrement rate if the vehicle speed is above a calibratible speed level and the clutch is released at a second decrement rate if the vehicle speed is not above the calibratible speed level.

14. The method as set forth in claim 13, wherein the calibratible speed level is approximately 16 KPH, the first decrement rate is approximately 2%, and the second decrement rate is approximately 10%.

* * * * *